June 15, 1943.　　　　　G. FAST　　　　2,322,004
BEARING
Filed Oct. 24, 1934　　　　5 Sheets-Sheet 1
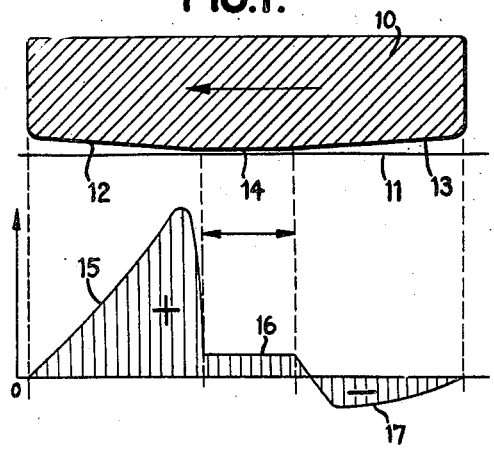
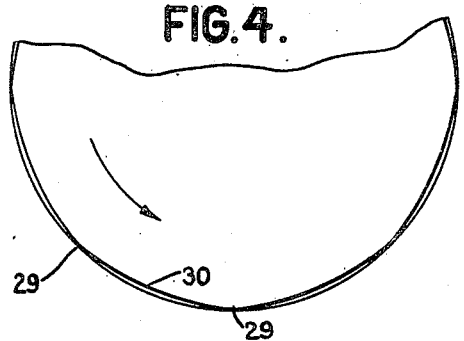
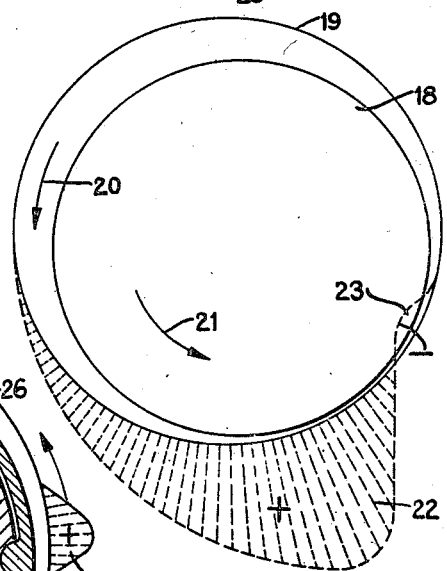
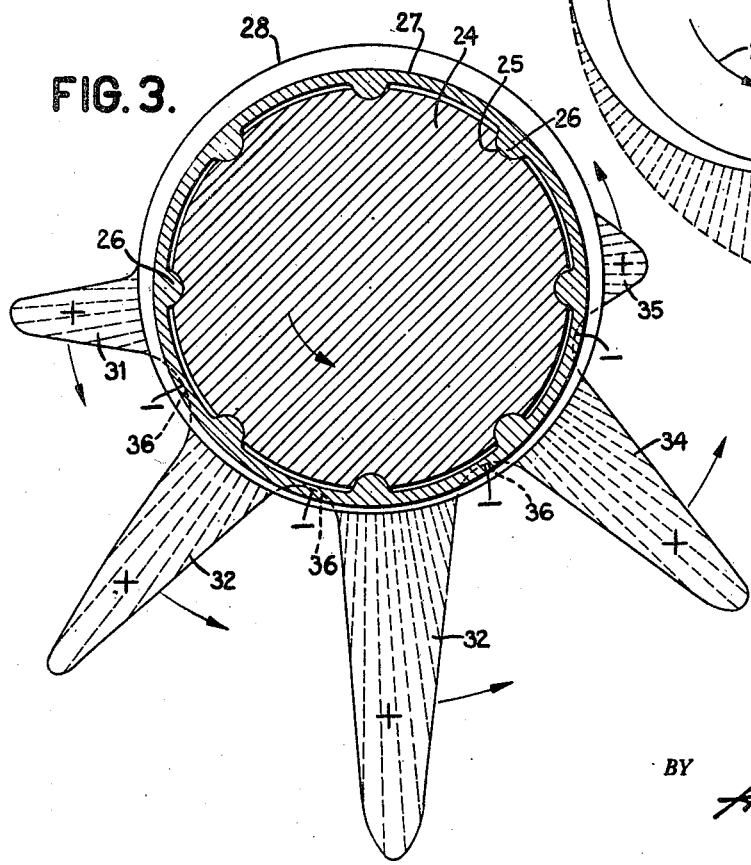
INVENTOR
GUSTAVE FAST
BY
ATTORNEY June 15, 1943.  G. FAST  2,322,004
BEARING
Filed Oct. 24, 1934  5 Sheets-Sheet 2

INVENTOR
GUSTAVE FAST

BY
ATTORNEY

June 15, 1943. G. FAST 2,322,004
BEARING
Filed Oct. 24, 1934 5 Sheets-Sheet 3

INVENTOR
GUSTAVE FAST
BY
ATTORNEY

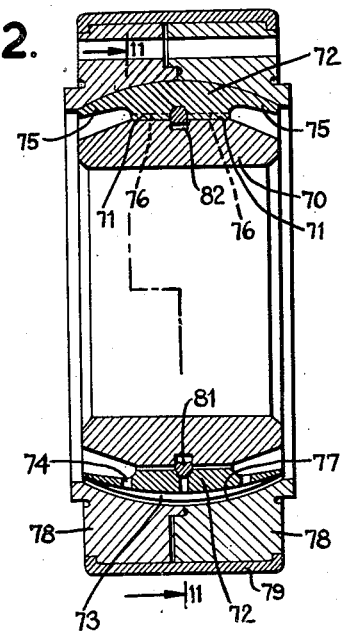
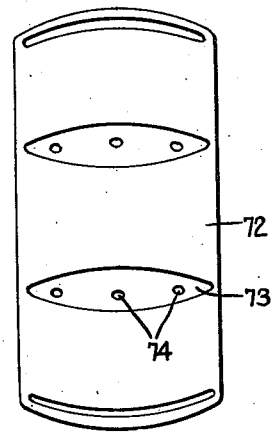
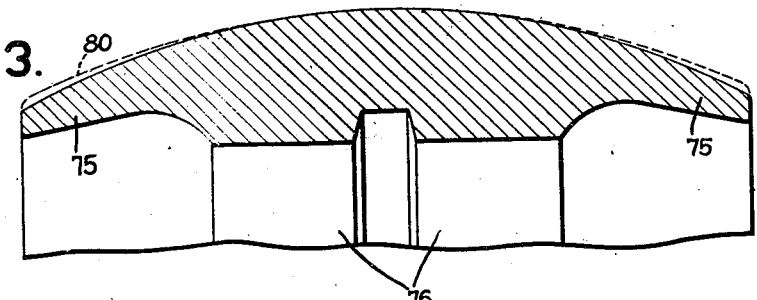
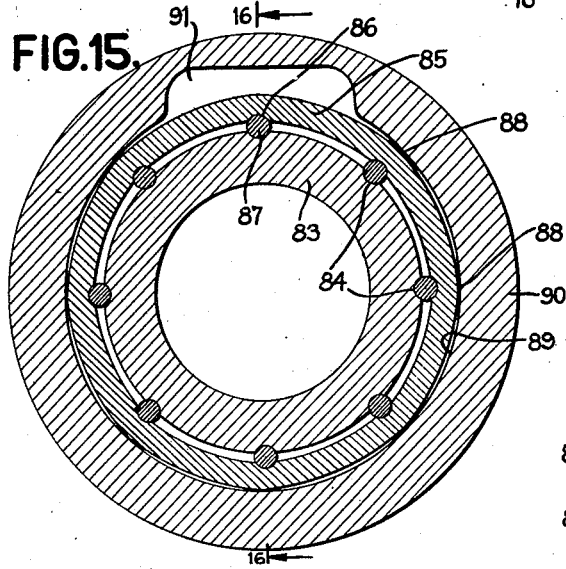
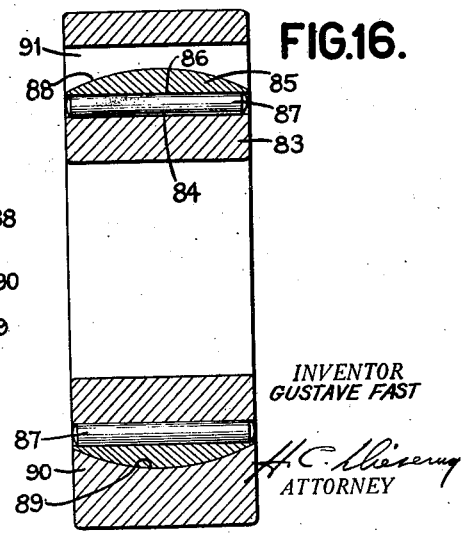
INVENTOR
GUSTAVE FAST
ATTORNEY June 15, 1943.   G. FAST   2,322,004
BEARING
Filed Oct. 24, 1934   5 Sheets-Sheet 5

INVENTOR
GUSTAVE FAST
BY
ATTORNEY

Patented June 15, 1943

2,322,004

UNITED STATES PATENT OFFICE 2,322,004

BEARING

Gustave Fast, Lindamoor-on-Severn, Md., assignor, by mesne assignments, to The Fast Bearing Company, Baltimore, Md., a corporation of Maryland Application October 24, 1934, Serial No. 749,691

25 Claims. (Cl. 308—121)

This invention relates to the construction of bearings, including radial, thrust and reciprocating bearings or combinations thereof, and has for a particular object the development of a bearing of simple and inexpensive character utilizing film lubrication with a maximum degree of efficiency. It relates also to a novel method of providing film lubrication.

It is well recognized that for the production of film lubrication it is necessary to provide a wedge-shaped passage between the relatively moving surfaces, the relative movements of the parts tending to force oil under considerable pressure toward the converging end of the passage. The thin film of oil thus developed under a suitable pressure serves to hold the relatively moving surfaces apart so that metal-to-metal contact is eliminated. Obviously, the capacity of a bearing of this character is determined by the area of the surface over which the film is formed and the average or mean pressure per unit of area developed in the film. In order to reduce to a minimum the size of a bearing for a particular purpose, it is desirable to develop relatively high film pressures. Furthemore, it is desirable to produce a film of reasonable thickness. For this purpose the bearing should be so constructed as to retard the leakage at the sides to a satisfactory extent.

Film lubrication is developed in the operation of an ordinary circular journal in a circular bearing but the conditions are not satisfactory for the handling of heavy loads. Efforts have been made in the past to develop more efficient film lubrication of bearings but these have not proved very successful except in connection with certain types of thrust bearings. These prior efforts have involved the provision of special bearing blocks arranged to tilt in such a way as to provide wedge-shaped passages between the relatively moving surfaces capable of forming high pressure films of suitable thickness. Constructions of this sort have invariably been expensive and have involved certain difficulties, particularly as applied to radial bearings. If the blocks are formed as a part of the stationary member, certain ones are continuously subjected to maximum pressure conditions and there is a serious tendency toward overheating. Application of the blocks to the rotating member introduces complications in the way of attachment and also gives rise to an objectionable centrifgual action upon the blocks, which becomes particularly serious at high speeds.

The present invention affords a simple, reliable and inexpensive construction capable of developing high pressure lubricating films of appropriate thickness to provide excellent lubrication as well as resistance to shocks that may be transmitted to the bearing. The improved bearing is economical in its lubricant requirements due to the fact that excessive heating is eliminated. Furthermore, the initial cost of the construction is considerably less than the ordinary block type bearings.

Other objects and advantages of the invention will appear from a detailed description of certain illustrative embodiments of the same which will now be given in conjunction with the accompanying drawings in which:

Figure 1 is a diagrammatic view showing the pressure developed at different points in a lubricating film between two surfaces movable rectilinearly relative to each other.

Figure 2 is a similar view showing the pressures developed between an ordinary journal and bearing.

Figure 3 is a similar view showing the pressures developed in a radial bearing embodying certain features of the present invention.

Figure 4 is a diagrammatic view illustrating the relation between the journal and bearing surfaces in a construction embodying the invention.

Figure 12 is an axial section through the last mentioned modification.

Figure 13 is an enlarged section through a portion of a member employed in the construction of Figures 11 and 12.

Figure 14 is a plan view of said member.

Figure 15 is a transverse section through a self-alining bearing constructed in accordance with the invention.

Figure 16 is an axial section through said bearing, taken along the line 16—16 of Figure 15.

Figure 5:
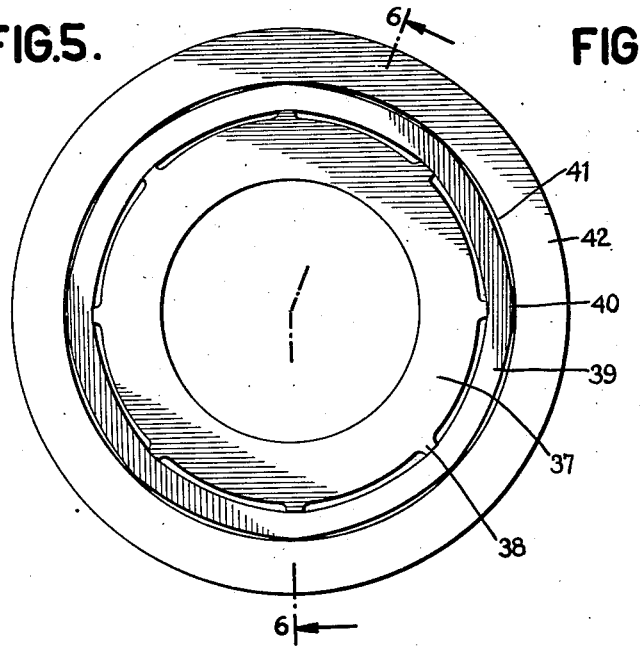
Figure 5 is a side elevation of a bearing assembly constructed in accordance with the invention.

Referring now to Figure 1, there is illustrated diagrammatically a member 10 shiftable rectilinearly in the direction of the arrow with reference to the surface 11 of a stationary member. The under surface of the member 10 is formed with two inclined portions 12 and 13 and an intermediate portion 14 parallel with the surface 11. The construction is such that wedge-shaped pockets or passages are formed between the surface 11 and the surfaces 12 and 13. As the member 10 shifts in the direction of the arrow, the lubricant, which may be assumed to be around the two relatively movable members, will be forced into the wedge-shaped passage beneath the surface 12 and a gradually increasing pressure will be built up upon this film of oil substantially up to the point of greatest constriction, which occurs at the forward edge of surface 14. The way in which the pressure increases within this passage is indicated by the line 15 and the cross-hatched area beneath this line. Similarly, the pressure between the surfaces 11 and 14 is indicated by the line 16 and the area beneath it. As illustrated, the pressure in this constricted, parallel-sided portion of the passage is comparatively low and, in fact, it may reach zero. When the diverging passage between the surface 11 and surface 13 is reached, the pressure falls off sharply and even reaches a negative value. This is represented by the line 17 and the area above it. Obviously if the direction of movement of the member 10 were reversed, the pressure conditions would also be reversed. It will be seen from the foregoing that a continuous film will be provided over the entire area of the under surface of the member 10 unless, perhaps, the creation of a negative pressure or partial vacuum in the diverging passage will cause an inflow of air to partly break this film. In any event, it will be seen that the center of pressure will be located toward the left or in advance of the center of the member 10.

A somewhat similar film condition arises in an ordinary bearing between a circular journal and circular bearing member; this condition is illustrated in Fig. 2. It will be understood, of course, that the clearance between the journal 18 and the circular bearing opening 19 is greatly exaggerated to indicate more clearly the disposition of this clearance when the shaft is rotated. Actually the clearance will be quite small but due to the location of the shaft axis a slight distance below the axis of the bearing opening, a wedge-shaped, oil-receiving passage will be formed and oil will be drawn into this passage, as indicated by the arrow 20. This is based upon an assumption that the shaft is rotated in the direction of the arrow 21. Now, as the shaft rotates the pressure of the oil film developed in the wedge-shaped passage will quickly assume the relation indicated graphically by the lined portion 22 of the diagram. It will be seen that after the pressure attains a maximum at or slightly in advance of the point at which the journal approaches the bearing surface most closely, there is a rather sharp falling off in the pressure until it actually attains a negative value, as shown by the portion 23 of the diagram, at a diverging portion of the passage between the journal and bearing. The conditions under which the oil film is produced in an ordinary bearing of this sort are not favorable to the production of a film of high pressure and therefore the capacity of the bearing is rather limited. In order to support a load of given value, it is necessary to provide an unduly large bearing. Moreover, it will be noted that the maximum pressure occurs always at the same point on the bearing and therefore this point has a tendency to become over-heated. Such over-heating is not only bad for the bearing but has a deteriorating effect upon the lubricant. Furthermore, the viscosity of the oil is considerably reduced at higher temperatures so that it becomes more difficult to maintain a film of satisfactory thickness.

Referring now to Fig. 3, there is shown a simple application of the present invention. This construction involves a journal 24 provided with longitudinal recessses or depressions 24 adapted to receive correspondingly shaped projections 26 carried by the inner surface of a ring 27. This ring should have a certain amount of flexibility and resilience so as to permit those portions intermediate the projections 26 to be flexed inwardly, in the manner to be explained. When the journal is stationary, the periphery 27 of the ring may be truly circular and substantially concentric with the bearing opening 28. However, when the journal is rotated in the direction of the arrow, and an oil film, of the type explained in connection with Figure 2, is created, a pressure is set up and this, when applied to a section of the ring 27 between two of the projections 26, will tend to flex the section inwardly about the projections. This will occur to each section of the ring as it passes through the pressure zone 22 of Fig. 2.

As the result of the flexing of the ring in this way, there is created a series of high points at the periphery of the ring, such as indicated graphically at 29 in Fig. 4, these being directly at or in line with the projections 26. The intermediate portions, being flexed inwardly, as indicated by the line 30 in Fig. 4, tend to form wedge-shaped passages on either side of the projecting points 29. The formation of these independent wedge-shaped passages modifies the single wedging passage of the Fig. 2 diagram and sets up a series of successive high and low pressure zones. Thus, as one of the projections 26 of the ring passes below the horizontal plane through the axis of the journal, a converging wedge-shaped passage is formed just in advance of this projection and this tends to create a pressure condition, indicated by the cross-hatched area 31. As the journal continues its rotation, and the above mentioned projection 26 is carried nearer the bottom of the bearing, the actual pressure of the oil film within the converging passage increases gradually until it attains the magnitude, indicated graphically by the cross-hatched area 32, and then to the extent indicated by the cross-hatched area 33. At this point the maximum pressure on the film is attained and as the projection is carried beyond toward the horizontal, axial plane again, the pressure decreases, as indicated by the cross-hatched areas 34 and 35. At any given instant there will be pressure areas of the type indicated at 31, 32, 33, 34 and 35 around corresponding projections 26. Each of these pressure conditions will undergo the changes specified. Intermediate the zones of superatmospheric pressure there will exist zones 36 of slight subatmospheric pressure, due to the action of the diverging passages formed on the retreating sides of the projections 26.

It will be seen that in this construction the pressure areas are constantly shifted so that any given point on the bearing surface 28 will be subjected to maximum pressure only momentarily and will then be relieved by the creation of even a slight subatmospheric pressure. When the subatmospheric condition is created, a rush of oil toward the point is produced and this assists in cooling it preparatory to the next high pressure conditions. Furthermore, the wedge-shaped films, produced as a result of the flexing of the ring 27, will be of such character that considerably higher oil pressures are developed than in the plain journal construction of Fig. 2 so that a greater load may be borne by a bearing of given dimensions. Experience has shown that a satisfactory film pressure cannot be developed unless a proper relation is maintained between the length and width of the film. Ordinarily it is desirable to provide a film that is about as wide as it is long. The present construction makes it possible to very readily maintain this relation without resorting to an excessively wide bearing. Moreover, the pressure developed in the improved bearing is distributed and equalized over a greater portion of the lower half of the bearing at any given instant so that there is less tendency for the journal to shift toward one side of the bearing opening.

While the flexible ring construction of Fig. 3 has decided advantages over the ordinary bearing construction of Fig. 2, it is objectionable in that some time is required to build up the film pressure required to flex the ring 27, in the manner explained, and some energy is utilized in flexing the successive sections of the ring between projections 26 as they are carried into the pressure zone. These objections might be overcome by so machining or grinding a rigid journal member or bearing member as to provide it with an undulatory surface capable of forming proper wedge-shaped pockets with the non-undulatory surface of the other member.

The objections to the construction of Figure 3 may be more simply overcome by constructing the bearing in such a way that the separable ring is pre-flexed, i. e., is already distorted to present a contour such as designated by the line 30 in Fig. 4 prior to rotation of the member. For this purpose, referring to Figures 5 and 6, there may be provided a journal hub 37 arranged to be mounted upon the shaft and secured thereto in any convenient way to rotate with the shaft. This hub may have a series of projections 38 between which is formed a corresponding series of depressions. A ring 39, formed with truly cylindrical inner and outer surfaces from flexible and resilient material, is pressed over the projections 38 or is first expanded by heat and then applied over these projections. Upon shrinking, by cooling, a tension is set up in the ring 39, which will cause it to become deformed, in the manner indicated on an exaggerated scale in Fig. 5. Opposite each of the projections 38 a high point 40 will be provided at the surface of the ring while intermediate these high points the ring will be flexed inwardly to provide, in cooperation with the inner surface 41 of a bearing sleeve 42, a series of wedge-shaped passages. This construction will enable the immediate production of pressure conditions, of the type illustrated in Fig. 3, upon the commencement of rotation of the member. The construction of the ring 39 is preferably such that a change may readily take place in the shape of those portions between the projections 40 during the rotation of the ring so that an even more favorable condition for the production of high oil pressure films may be created. Thus, the low or negative pressure at the diverging portions of the ring will tend to produce an outward movement at these points and will enable the positive pressure at the converging portions to produce further inward flexure and a lengthening of the effective portions of the films.

Figure 6:
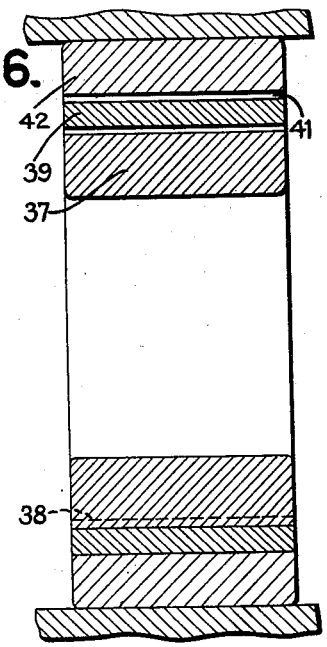
Figure 6 is an axial sectional view through the bearing of Figure 5, taken along the line 6—6.
Figure 7:
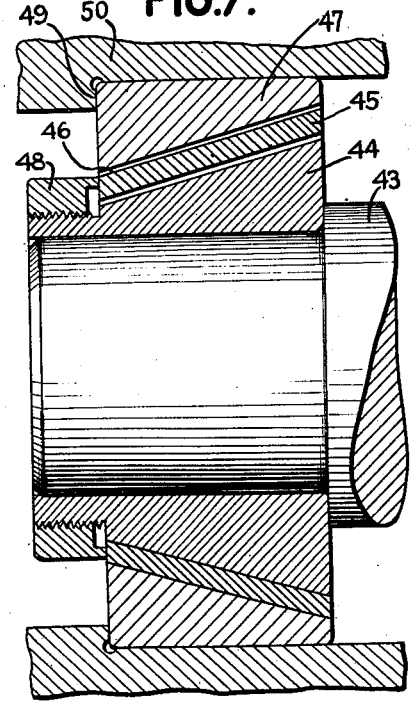
Figure 7 is an axial section through a conical bearing constructed in accordance with the invention.

In Figure 7 there is illustrated a construction generally similar to that shown in Fig. 5 but applied to a conical bearing. In this construction the shaft 43 may have secured to a reduced portion thereof a hub 44 having an outer conical face. A series of ribs or projections, corresponding with the projections 38 of Fig. 5, may be formed around the conical surface of the hub and a flexible and resilient ring 45 may be applied in the same manner as the ring 39 or may be pressed over these projections. The deformation of the ring upon cooling will create a series of high points about its substantially conical surface and a series of wedge-shaped pockets 46 in cooperation with the truly conical, inner surface of a bearing member 47. A screw-threaded retainer 48 may be applied to the end of the hub 44 as a convenient means for retaining the ring 45 in proper position upon the ribs of the hub. This may also be used in pressing the ring over the projections to any extent desired. It will be apparent that in the operation of the journal the same general pressure conditions will be created between the ring 45 and bearing member 47 so as to maintain these parts out of metal-to-metal contact. This construction provides a combined radial and thrust bearing. To receive the thrusts the member 47 may be forced against an annular shoulder 49 formed in housing member 40. By providing two bearings of this type in opposed relation the thrusts of the shaft in both directions may be taken.

Figure 8:
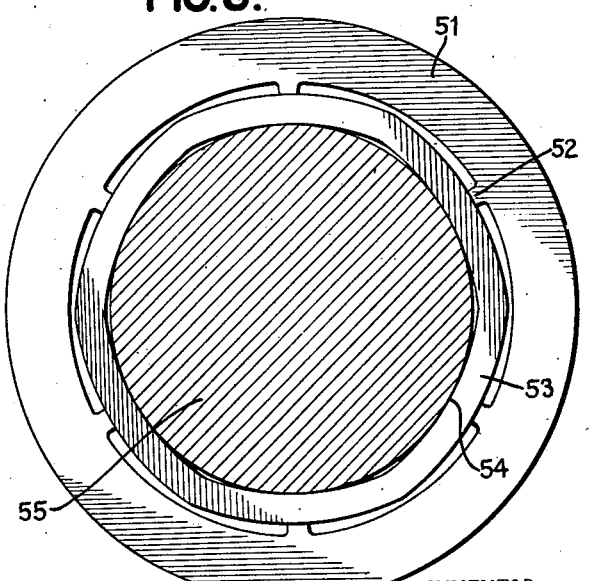
Figure 8 is a side elevation of a modified form of bearing assembly with a journal shown in section.

In lieu of providing the irregular surface on a member connected with the journal, this surface may be provided on a member connected with the bearing itself. This is particularly desirable when the journal is held stationary and the bearing is rotated since it enables the continuous shifting of the high pressure areas. For this purpose there may be provided a rotatable bearing member 51 having a series of inwardly extending projections 52 arranged to engage the periphery of a resilient, flexible ring 53. In the assembly of the parts, the ring may be pressed into the bearing member 51 or the latter may be suitably expanded by heat to freely receive the ring 53 in truly circular form, the ring being of slightly greater outside diameter than the circle defined by the inner ends of the projections 52 when the parts are at the same temperature. When the member 51 cools and contracts, the projections 52 will forcibly engage the ring 53 and distort it into the general shape indicated in Figure 8. It will be understood, of course, that the distortion is greatly exaggerated in this figure. However, at or in line with each projection 52 there will be a point 54 on the inside circumference of the ring, which will be somewhat closer to the center of the bearing as a whole than portions of the ring intermediate these points. This will produce in conjunction with the circular periphery of the journal member 55 a series of wedge-shaped pockets adapted to produce a lubricating film of the general type produced in the preceding embodiments. By making the ring 53 sufficiently flexible the distortion may be augmented, if desired, as the pressure of the film increases. If the member 55 is stationary and the bearing 51 rotated in the manner suggested, the points 54 will continuously advance around the journal and thus continuously change the location of the high pressure areas with relation to the fixed member.

Figure 9:
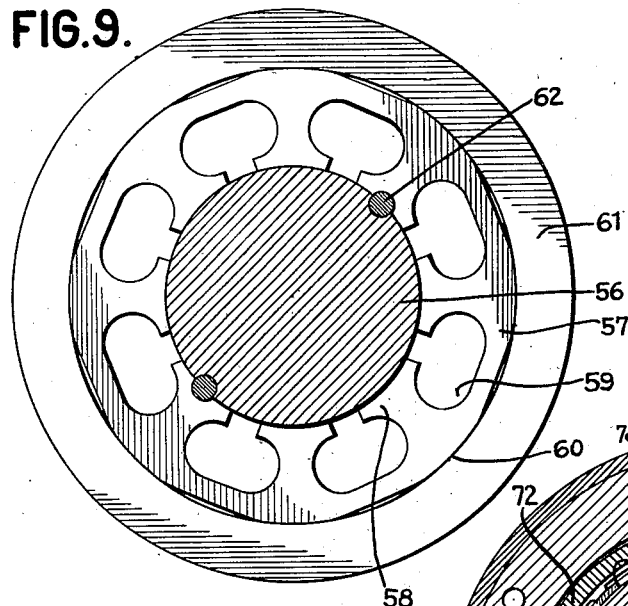
Figure 9 is a similar view of a further modified bearing assembly.
Figure 11:
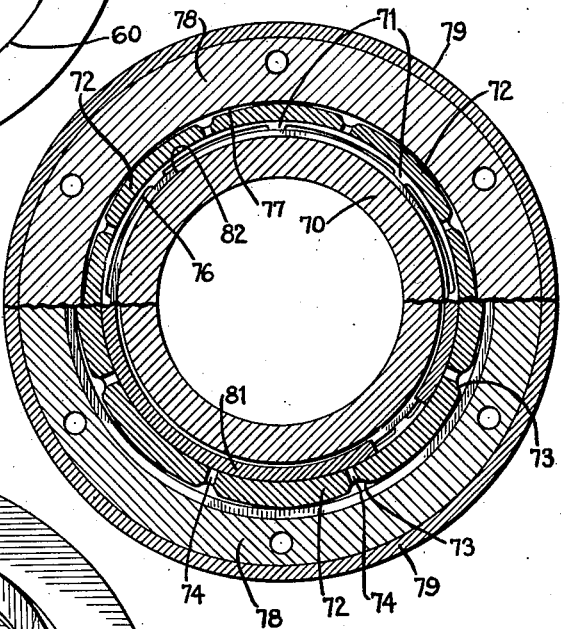
Figure 11 is a transverse section through another modification taken along the broken line 11—11 of Figure 12.

If desired the hub and flexible ring, previously described as separate elements carried by a journal, may be combined into a single member. Referring to Fig. 9, a journal 56 may be provided with a resilient hub member 57. The latter may have a series of inwardly projecting portions 58, the inner ends of which are arcuate and adapted to snugly fit the periphery of the journal. Between the adjacent projections 58 the member 57 is provided with a series of large openings 59, preferably of the general contour illustrated in Fig. 9. These openings provide a relatively thin wall between their outer surfaces and the outer surface of the member 57 and also provide reduced neck portions on the projections 58 intermediate the outer and inner surfaces of the hub member. Furthermore, the arrangement shown provides a large area of contact between the inner ends of projections 58 and the surface of the journal. Prior to the assembly of the hub on the journal the projections 58 should define a circle slightly smaller in diameter than the diameter of the journal. Upon shrinking the hub member onto the journal, or in pressing it over the journal, the outer circumference of the hub member will become distorted into the form indicated in an exaggerated way in the drawings. A series of high points 60 will be provided opposite the projections 58 while intermediate these high points the periphery of the member will be slightly flattened so as to produce wedge-shaped pockets in conjunction with the inner surface of a bearing member 61. It will be apparent that with this construction an oil film of the same desirable character as those previously explained will be produced upon rotation of the journal. If desired, pins 62 may be driven into openings provided by recesses or indentations in the journal 56 and in certain of the projections 58 to insure turning of the hub member with the journal.

Figure 10:
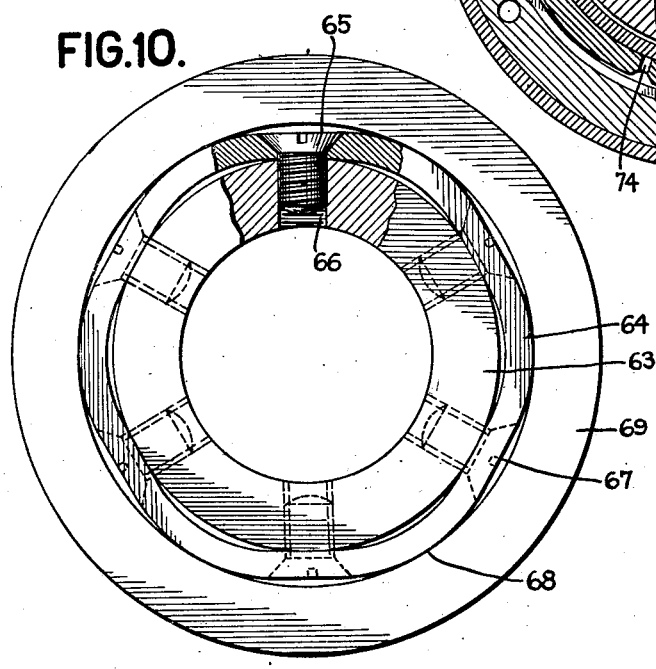
Figure 10 is a side elevation, partly in section, of a still further modification.

A further modification is illustrated in Fig. 10. Here a hub member 63 is arranged to be secured in any convenient way to a journal, the hub having strictly circular inner and outer surfaces. Surrounding the hub there is provided a resilient, flexible ring 64 which is of slightly greater inside diameter than the outside diameter of the hub. This ring may be distorted conveniently by the use of screws 65 adapted to be counter-sunk into the surface of the ring and arranged to have threaded engagement with openings 66 in the hub. By tightening the screws 65, a series of slightly flattened portions 67 will be provided around the periphery of the ring while intermediate these flattened portions there will be formed slight bulges or projections 68 defining a circle only slightly less in diameter than the bore of a journal sleeve 69. It will be apparent that this construction affords another excellent means for providing the wedge-shaped passages between the bearing and journal productive of the desired high pressure oil films.

Referring now to Figs. 11 to 14, inclusive, a further modified construction is illustrated. This bearing is of the self-alining type arranged to take care of slight variations in the angular relation between the axes of the journal and bearing and arranged, also, to receive the relative thrusts of the journal and bearing. A journal hub 70 is adapted to be secured to a shaft in any convenient way. Over this hub there is pressed or shrunk a resilient, flexible ring 72 having a series of inwardly extending projections 71 defining a circle whose normal diameter is less than the outside diameter of the hub. Accordingly, when the ring is mounted upon the hub it will become distorted in the same manner as the rings previously explained. At points intermediate the projections 71, the ring 72 is provided with a series of transverse grooves 73, and a plurality of radial openings 74 extending from the outer to the inner surfaces of the ring. These grooves and openings assist in the flexing of the ring when it is mounted over the hub and also assist in the lubrication of the bearing. Thus, oil which is thrown from the outer surface of the hub may be forced by centrifugal action through openings 74 and distributed along the grooves 73 to all portions of the surface of the ring and in this way effect thorough lubrication of the journal. It will be noted that the ends of the hub are chamfered to serve as oil slingers.

The ring member 72, according to the present invention, preferably has an outer surface that is arcuate in an axial direction as well as circumferentially but it is not truly a portion of a sphere. While the curvature circumferentially is about the central axis of the ring, the axial curvature is about a point offset slightly from the true center of the ring and is of a radius exactly equal to that of the bearing surface with which the ring cooperates. This is slightly greater than the radius of the ring itself due to the necessary clearance between the ring and bearing. Therefore, the surface of the ring is not strictly spherical but spheroidal. This provides for line contact between the ring and bearing in a transverse plane rather than simply a point contact in the radial action of the ring and bearing. The ends 75 of the ring are thinner-walled than the central portion, the construction being such that the ends do not engage the hub 70. The projections 71 do not extend the full width of the ring but simply extend across the central section 76 of the ring. By forming the ends of the ring in the way shown, they serve as oil collector lips to receive the oil which flows therein by gravity as the ring dips below the oil level and also to receive the lubricant thrown from the hub. This oil is passed forcibly through the apertures 74 by a centrifugal pumping action. The outer, deformed or undulated, non-spherical surface of the ring 72 cooperates with a spherical bearing surface 77 provided at the interior of complementary bearing members 78. Any suitable means, such as hollow rivets or a ferrule 79 having its edges turned inwardly over annular shoulders provided on the members 78, may be employed for retaining these members in assembled relation.

Now, in applying an outward pressure or tensioning force to the ring 72 at spaced points around only the mid section 76, the tendency will be to distort the ring not only in a circumferential direction but also in a transverse or axial direction. For example, referring to Fig. 13, the ring may initially have its outer surface curved in an axial direction along the arc indicated by the dotted line 80, corresponding exactly with the surface of the bearing. However, when the ring is distorted in the way explained, portions of the central section 76 will be forced outwardly while the ends 75 at corresponding points will not be directly tensioned and therefore these ends will tend to curl inwardly slightly to assume the position indicated by the full lines in Figure 13. This has various advantages, one of which is to provide for better contact between the ring and one of the bearing members 78 when the bearing and journal are subjected to a relative thrust. In order to transmit the thrust between the hub 70 and the ring 72, a split ring 81 may be mounted in a recess 82 in the hub 70 and a corresponding recess in the inner surface of the ring 72.

Instead of providing integral deformation lugs or projections on a flexible ring or a hub or other member of the bearing structure, removable pins may be employed to produce the desired deformation. Thus, referring to Fig. 15, a journal hub 83, adapted to be secured to a shaft, may be provided with depressions or identations 84 on its outer surface while a flexible, resilient ring 85 may be provided with corresponding indentations or depressions 86 on its inner surface. Pins may be driven into the openings formed by these series of indentations. The shape of the indentations and of the pins 87 may be varied to suit the particular circumstances. Arcuate depressions and substantially cylindrical but slightly tapered pins are shown and these will be found quite satisfactory. In driving the pins into position or in shrinking the ring 85 over the pins, the ring will be distorted so as to present a series of high points 88 in line with the pins and flattened portions, intermediate these high points, arranged to form wedging passages in cooperation with the inner surface 89 of a bearing member 90. If desired, the bearing may be of the self-aligning type, in which case the outer surface of the ring 85 and the inner bearing surface of member 90 should be arcuate in cross section, as shown in Fig. 16.

In order to permit easy assembly of this unit without forming the bearing member in two sections, the top portion of the bearing member may be cut away, as indicated at 91 in Fig. 15. After the hub and ring have been assembled, together with the pins 87, this unit may be turned at right angles to the position shown in Fig. 15 with relation to the member 90. The width of the opening 91 is slightly greater than the axial dimension of the hub and ring so as to permit these elements to be lifted into the opening. When the unit is in a central position, it may then be lowered and rotated into the plane of the member 90, as shown in Fig. 15. The spherical surfaces of the ring and bearing member will permit this rotation. In lieu of providing the bearing member with a single large slot or opening 91 it may be provided with two slots of only half the depth of that shown these being arranged at opposite ends of a diameter at about right angles to the direction of the load. It will be apparent that the pins 87 not only serve to deform the ring but also prevent relative turning of the ring and hub.

Figure 17:
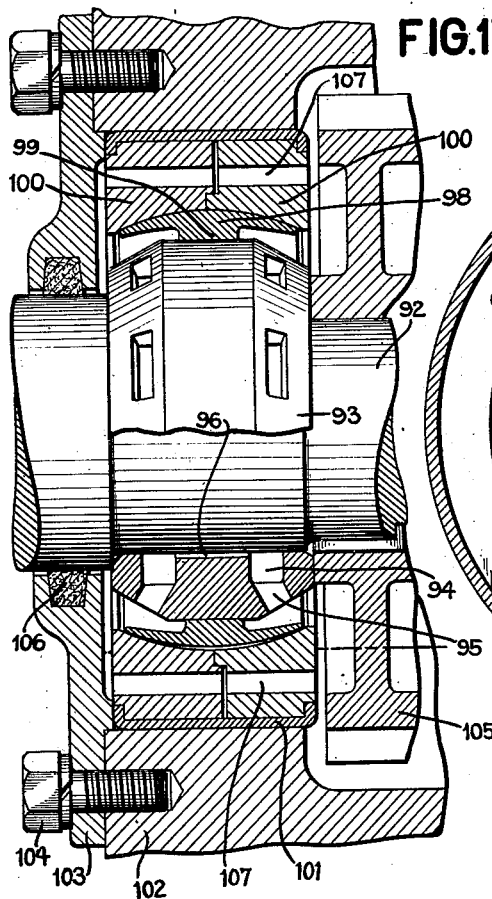
Figure 17 is an axial section through a further modification with a hub member shown partly in elevation and partly in section and showing a portion of the housing around the bearing.
Figure 18:
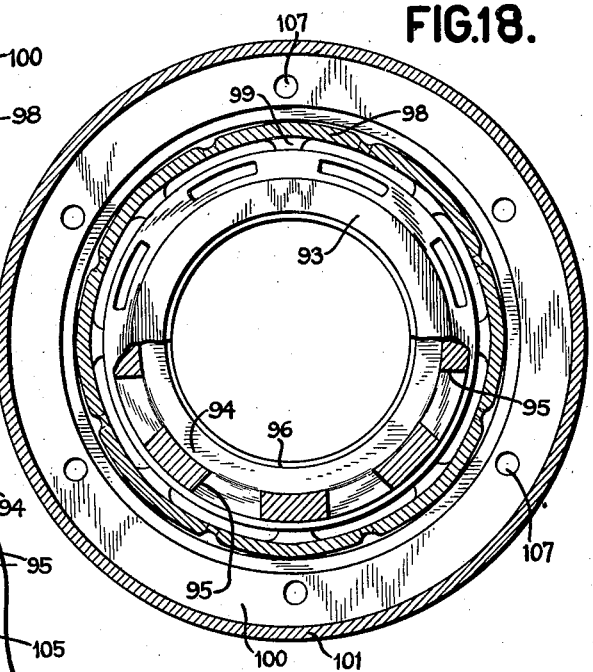
Figure 18 is a transverse section through the bearing of Figure 17.
Figure 20:
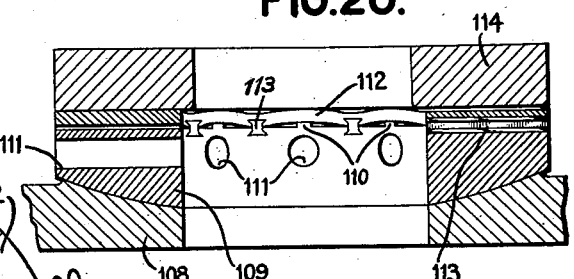
Figure 20 is a sectional view along the line 20—20 of Figure 19.

In the construction of large bearing units intended to support heavy loads, it may be desirable to form the hub mounted on the shaft in such a way as to permit yielding of the metal as it is subjected to high pressures in passing through the main bearing zones. The combined flexibility of the hub and of the deformation ring will serve to distribute the high pressure oil films over a greater portion of the circumference of the bearing. In this connection it should be observed, however, that the deflection of the hub should not equal the deformation of the ring since then the wedge shaped film would be destroyed. A unit embodying a flexible hub is disclosed in Figs. 17 and 18. Thus, a shaft 92 may be provided with a hub 93 having a pair of circumferential grooves 94 on its inner surface and also, if desired, a series of radial openings communicating between the outer surface of the hub and the circumferential grooves 94. The central portion of the hub is provided with a slight clearance, as indicated at 96, with relation to the shaft so that the hub is supported only by the contact of the end or outer portions with the periphery of the shaft. The outer surface of the central portion of the hub may be formed strictly cylindrical. A ring 98 of flexible and resilient construction is provided around the hub. This ring may be of substantially the same form as the ring 72 of Fig. 12, being provided with spaced inwardly extending projections 99 around its inner surface. When the ring is pressed or shrunk over the hub, the outer surface of the ring will be deformed in the same way as the ring 72. Provision may be made for relative thrusts between the ring and hub in any suitable way. The friction between these parts, upon the shrinking of the ring, may be relied upon for this purpose and may also provide the necessary resistance to relative turning. If desired, other means, such as keys, and a spring ring similar to 81 in Fig. 12, may be provided to receive the thrusts and prevent turning of the ring with relation to the hub.

The balance of the construction may be substantially the same as the Fig. 12 unit. The bearing sleeve may be formed in two sections 100 held together by a ferrule 101. This bearing sleeve has a spherical inner surface arranged to form wedge-shaped passages with the deformed, spheroidal surface of the ring 98 so as to enable building up of the desired oil films. The bearing unit as a whole may be mounted in a housing casting 102, the outer end of which is closed by a plate 103, secured in any suitable way, as by means of bolts or screws 104. At its opposite end the housing may be similarly closed and provision may, as usual, be made at some point for the introduction of additional lubricant. The bearing unit may be held against the plate 103 by the driving or driven member 105 mounted upon the shaft within the housing and by the thrust of the journal. To prevent leakage of the lubricant between the shaft and the plate 103, an oil retaining element 106, formed of felt or the like, should be employed. A series of openings 107 may be provided at spaced points through the members 100 to permit the free passage of oil from one side of the bearing to the other. It will be understood that this or some equivalent type of lubricant enclosure will be provided in conjunction with all of the forms of the invention previously explained.

The invention is also applicable to a thrust bearing construction. For this purpose a base member 108 may be provided with a spherical seat to receive a bearing ring 109. The outer face of this ring may be provided with projections 110 at spaced intervals forming radial ribs. A series of openings 111 may be provided through the ring, parallel with the ribs and adjacent the same, to allow the free passage of oil between the interior and exterior of the ring. These openings, furthermore, may provide a certain flexibility similar to that of the hub 93 of Figure 17. This insures proper distribution of the load over all of the projections since if one is slightly higher than the other, due to improper machining, it will simply be depressed to the proper level by the load. A flexible and resilient ring 112 is secured to the outer surface of the thrust ring by any suitable means such as a series of screws or a series of dovetailing pins 113. One of these pins may conveniently be provided in each of the spaces between the projections 110. As shown, the under surface of the ring 112 and the upper surface of the element 109 are suitably grooved to receive the pins 113 which may be tapered slightly so that when driven into place they will draw portions of the flexible ring, between the projections 110, into contact with the bearing ring. It will be apparent that high points will be produced at or in line with each of the projections while depressions will be formed intermediate the projections so as to form wedge-shaped pockets in cooperation with the under surface of a thrust collar 114 secured to the shaft whose thrust is to be taken by the bearing. On rotation of the shaft and its collar, a high pressure oil film will be produced between the opposed faces of the collar and flexible ring.

It will be appreciated that since the bearing surfaces are held apart by the fluid film as soon as the parts are placed in relative motion there is very little occasion for wear, except in starting up and therefore it is not essential to employ highly wear resistant materials. Any materials may be used so long as they will withstand the compressive forces involved. It is, of course, advantageous to employ wear resistant materials to overcome as far as practicable, the wear incident to starting up. If rubber is used the bearing may be lubricated with water.

Since the flexible ring employed is initially provided with a regular, non-undulatory surface it may be readily machined or finished. The character and amplitude of the undulations in the surface when in use may be readily controlled by the flexibility of the ring and the tension applied thereto by the deformation ribs or projections. Accuracy of control is important since the angles of the desired wedge-shaped passages are extremely small, usually involving a rise of only about .0005" to .003" per inch of length. It should be understood that when reference is made herein to the flexibility of the ring this does not mean that the ring may be readily flexed by the hand. The rings may be formed of steel of substantial thickness so that they are flexed only when subjected to relatively large forces either by the projections or the pressure of the oil films.

While certain illustrative embodiments of the invention have been disclosed in considerable detail it will be understood that various changes may be made in each of the forms without departing from the principles of the invention. Features disclosed in connection with one embodiment may in many cases be applied to other embodiments. For example, the pins of Figure 15 may be substituted for the deformation projections shown in the other views.

Figure 19:
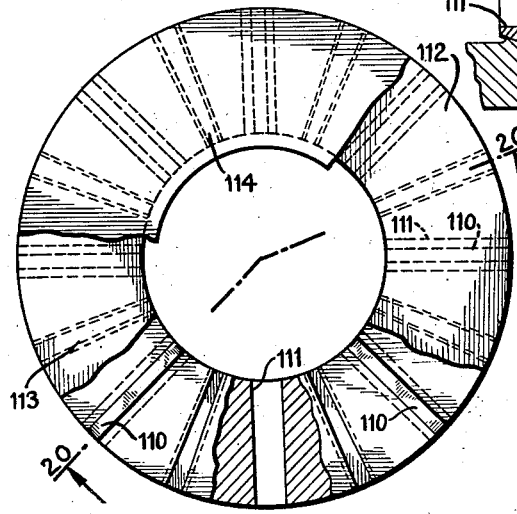
Figure 19 is a plan view, with parts broken away to disclose other parts below, of a thrust bearing embodying the invention.

In all of the forms of the invention disclosed the wedge-shaped passages between the deformation ring and bearing or journal have been shown symmetrical with relation to the high points. This is desirable whenever the journal or bearing is intended to be reversible but in cases in which the rotating member is constantly driven in the same direction it will be desirable to form a longer and sharper angled wedging pocket on the converging side of the projecting point than on the diverging side. This will provide for a larger positive pressure area and smaller negative pressure area which is, of course, more favorable to the production of an effective film. This result may be accomplished in the construction of Figure 9, for example, by suitable modification of the openings 59, and in the construction of Figure 11 by shifting each of the grooves 73 to a point somewhat closer to one of the projections 71 than the other of the pair between which it is located. Similarly in a construction of the type shown in Figure 19 the same effect may be produced by locating the pins 113 to one side of the center of the spaces between the adjacent projections 110. This same scheme could, of course, be employed in a radial bearing or in a conical bearing or a spherical self-alining bearing.

While in all of the constructions illustrated the bearing member has been shown as formed in one integral piece, circumferentially, it may, for some purposes, be made in two or more parts as, for example, when the bearing is carried by a connecting rod and can only be assembled when formed in several parts.

The invention is applicable also to bearings between members movable rectilinearly or in other non-circular paths with relation to each other. A flexible element may be applied in undulatory form to one of the cooperating members while the other member may be made to present a regular, non-undulatory surface capable of forming with the element the desired wedge-shaped pockets.

As a modification of the construction shown in Figures 11 to 14, inclusive, the flexible ring might be machined, or ground, with an undulatory outer face so that no distortion for this purpose is necessary. In that event the transverse projections within the ring could be eliminated and the ring could be shrunk or pressed onto the hub with full cylindrical contact between the ring and hub. However, by limiting this contact to a bank adjacent the center of the ring and providing an outward tension over this entire band, the same desirable inward deflection of the ends of the ring, as explained before, would be brought about.

So, also, the force feed lubrication provided by the inwardly curled lips 75 of the Figure 13 construction might be obtained in a construction in which the hub and ring are made integral and the undulations are machined or ground in the outer face of this unit. The ring portion of the unit should then be suitably formed to provide oil collecting lips.

What I claim is:

1. In a structure of the class described, a plurality of relatively rotatable members, a flexible annular element mounted between said members and arranged to transmit a load from one to another, one of said members having a face forming a portion of a substantially spherical surface, said element having a face forming a similar spherical surface when tensioned, and means for tensioning said element only intermediate its ends at spaced points about its circumference to deform said face.

2. In a structure of the class described, a hub arranged to be secured to a shaft, said hub being supported at its ends and having a yieldable central portion, a ring carried by said hub, means coacting between said hub and ring for tensioning the latter to deform its outer surface, and a bearing member cooperating with the outer surface of said ring and forming wedge-shaped oil film pockets therewith.

3. In a structure of the class described, a hub arranged to be secured to a shaft, said hub being supported at its ends and having a yieldable central portion, a ring carried by the central portion of said hub, means coacting between said hub and the central portion of said ring for tensioning the latter to deform its outer surface, and a bearing member cooperating with the outer surface of said ring to produce wedge-shaped oil film pockets therewith, said ring when untensioned and said bearing member having cooperating faces of substantially the same spherical contour.

4. In a thrust bearing a thrust receiving member, a thrust collar rotatable with relation to said member, and a flexible element secured to said member and flexed to provide a continuously undulatory surface cooperating with said collar.

5. In a structure of the class described, a bearing member having a truly spherical load receiving surface, and a journal element having a spheroidal surface cooperating with said spherical surface, said spheroidal surface having a radius of curvature in an axial direction precisely the same as said spherical surface.

6. In a structure of the class described, a bearing member having a truly spherical load receiving surface, and a journal ring having a surface cooperating with said spherical surface, said ring surface being curved in all directions, the radius of curvature in an axial direction being greater than that in a circumferential direction.

7. In a structure of the class described, a bearing member having a truly spherical load receiving surface, and a journal ring having a surface cooperating with said spherical surface, said ring surface being curved in all directions, the radius of curvature in an axial direction being greater than that in a circumferential direction, said ring being flexed circumferentially about a series of points to provide undulations in its surface.

8. In a structure of the class described, a bearing member, a journal member, a flexible ring mounted between said members, said ring and one of said members having substantially spherical cooperating surfaces, and means coacting between said ring and the other of said members for tensioning the ring and deforming the same about spaced points, said means causing the ends of said ring to deflect inwardly toward the axis of the ring.

9. In a structure of the class described, a bearing member, a journal member, a flexible ring mounted between said members, said ring and one of said members having cooperating surfaces curved in an axial direction over arcs of identically the same radius, and means coacting between said ring and the other of said members for tensioning the ring and deforming the same about spaced points, said means causing the ends of said ring to deflect inwardly toward the axis of the ring.

10. In a structure of the class described, a bearing member, a journal member, a flexible ring mounted between said members, said ring and one of said members having substantially spherical cooperating surfaces, means coacting between said ring and the other of said members for tensioning a central band around said ring at spaced points, said ring having its end portions beyond said band curved inwardly toward the axis of the ring to form oil collector lips, and passages in said ring for distributing oil collected by said lips.

11. In a structure of the class described, a bearing member, a horizontally disposed journal member having oil distributing passages therein, said journal member having a continuously undulatory outer surface adapted to provide wedge-shaped pockets in conjunction with said bearing member, and inwardly turned lips carried by said journal member for collecting oil and forcing it into said passages.

12. In a structure of the class described, a bearing member, a journal member, a ring mounted between said members, said ring being applied under tension to one of said members and having a central band contact with said member at circumferentially spaced points, and extensions carried by said ring out of contact with said member, the outer face of said ring being continuously undulated to form wedge-shaped pockets with the surface of the other member.

13. A bearing structure comprising a pair of relatively movable concentric members, and a yieldable ring between said members, said ring having at least four circumferentially spaced projections permanently fixed thereto and forcibly engaging one of said members for rotation of the ring in unison therewith, the ring being flexed permanently under an invariable initial force of substantial magnitude by the coaction between said projections and said one of said members, the other of said members having a surface of revolution cooperating with a surface on said ring, said ring being deformed by the flexing thereof to provide wedge-shaped lubrication pockets between said surface thereon and said surface of revolution.

14. A bearing structure comprising a pair of relatively movable concentric members, and a yieldable ring between said members, said ring having at least four circumferentially spaced projections permanently fixed thereto and having a shrunk-on engagement with one of said members for rotation of the ring in unison therewith, the ring being flexed permanently under an invariable initial force by the coaction between said projections and said one of said members, the other of said members having a surface of revolution cooperating with a surface on said ring, said ring being deformed by the flexing thereof to provide wedge-shaped lubrication pockets between said surface thereon and said surface of revolution, said surface of said ring having transversely extending grooves therein disposed intermediate said projections.

15. A bearing structure comprising a pair of relatively movable concentric members, and a yieldable ring between said members, said ring having circumferentially spaced projections permanently fixed thereto and engaging one of said members for rotation in unison therewith, the ring being flexed permanently under an invariable initial force by the coaction between said projections and said one of said members, the other of said members having a surface of revolution cooperating with a surface on said ring, said ring being deformed by the flexing thereof to provide wedge-shaped lubrication pockets between said surface thereon and said surface of revolution, said surface of said ring having transversely extending grooves therein disposed intermediate said projections, and said ring having passages extending from the inner to the outer surface thereof and communicating with said grooves.

16. A bearing structure comprising a pair of relatively movable concentric members, and a yieldable ring between said members, said ring having at least four circumferentially spaced projections permanently fixed to the inner surface thereof and engaging the inner one of said members for rotation in unison therewith, the ring being flexed permanently under an invariable, substantial initial force by the coaction between said projections and said inner one of said members, the other of said members having a surface of revolution cooperating with a surface on said ring, said ring being deformed by the flexing thereof to provide wedge-shaped lubrication pockets between said surface thereon and said surface of revolution, said surface of said ring having transversely extending grooves therein disposed substantially mid-way between each adjacent pair of said projections.

17. A bearing structure comprising a pair of relatively movable concentric members, and a yieldable ring between said members, said ring having circumferentially spaced projections permanently fixed thereto and engaging one of said members for rotation in unison therewith, the ring being flexed permanently under an invariable initial force by the coaction between said projections and said one of said members, the other of said members having a surface of revolution cooperating with a surface on said ring, said ring being deformed by the flexing thereof to provide wedge-shaped lubrication pockets between said surface thereon and said surface of revolution, said surface of said ring having transversely extending grooves therein disposed intermediate said projections, and said ring having passages extending from the inner to the outer surface thereof and communicating with said grooves, the ends of said ring being formed and arranged to provide oil collector lips adapted to deliver oil by centrifugal action to said passages.

18. In a structure of the class described, a bearing member, a journal member, a flexible ring mounted between said members, said ring and one of said members having substantially spherical cooperating surfaces, and means including spaced projections integral with said ring coacting between said ring and the other of said members for tensioning the ring and deforming the same about spaced points, said means causing the ends of said ring to deflect inwardly toward the axis of the ring.

19. In a structure of the class described, a bearing member, a journal member, a flexible ring mounted between said members, said ring and one of said members having substantially spherical cooperating surfaces, and means including spaced projections integral with said ring coacting between said ring and the other of said members for tensioning the ring and deforming the same about spaced points, said projections having their length extending axially of said ring and terminating inwardly of the ends of said ring to cause the ends of the ring to deflect inwardly toward the axis of the ring when the latter is tensioned.

20. In a structure of the class described, a journal member and a bearing member, one rotatable in relation to the other, and an annular element intermediate said members, said element having spaced axially extending openings forming projecting portions arranged to engage one of said members over more than half its periphery and place the element under tension, the tension so produced serving to deform a surface on said element to provide alternate bulges and depressions therein arranged to form wedge-shaped lubrication pockets in conjunction with a surface on the other of said members.

21. In a structure of the class described, a hub arranged to be secured to a shaft, said hub being supported at its ends and having a yieldable central portion, a ring carried by the central portion of said hub, means including projections integral with said ring coacting between said hub and the central portion of said ring for tensioning the latter to deform its outer surface, and a bearing member cooperating with the outer surface of said ring to produce wedge-shaped lubricating pockets therewith, said ring when untensioned and said bearing member having cooperating faces of substantially the same spherical contour.

22. In a structure of the class described, a bearing member having a truly spherical load receiving surface, a journal ring having a surface cooperating with said spherical surface, a hub supporting said ring and spaced means between said hub and ring for tensioning the latter and deforming its outer surface to provide wedge-shaped lubricant pockets in conjunction with said bearing member, said journal ring surface being spheroidal when the ring is untensioned and having its radius of curvature in an axial direction substantially equal to that of said spherical surface and greater than its radius of curvature in a circumferential direction.

23. In a radial bearing a rotating member, a member adapted to support said rotating member for rotation therein, and an element between said members adapted to transmit the load from one to the other, said element having a series of circumferentially spaced projections on one surface arranged to engage one of said members and having its opposite surface substantially parallel with a cooperating surface of the other of said members when the bearing is not under load, the portions of said element between successive projections being spaced from said one member and being sufficiently flexible to flex toward said one member in response to the oil pressures developed between said element and said other member upon rotation of said rotating member under load, thereby producing wedge-shaped pockets between said opposite surface of the element and said cooperating surface of said other member.

24. In a radial bearing two relatively rotating members, and a continuous annular element between said members adapted to transmit a load from one to the other and having a surface of revolution cooperating with a corresponding surface on one of said members, said element having a series of circumferentially spaced projections on its opposite surface adapted to engage the other of said members, said cooperating surfaces of revolution being normally substantially parallel so long as the bearing is not under load, the portions of said element between said projections being sufficiently flexible to respond to oil pressures created by relative rotation of said cooperating surfaces under load and thereby producing wedge-shaped pockets between said surfaces.

25. In a radial bearing a rotating member, a member adapted to surround and support said rotating member, and a flexible element between said members adapted to transmit the load from one to the other, said element having a series of projections on one surface spaced circumferentially not more than 90° apart and arranged to engage one of said members, the opposite surface of said element being substantially parallel with a cooperating surface of the other of said members when said element is in its normal unloaded condition, the construction and arrangement of said element and members being such that wedge-shaped pockets are provided between said substantially parallel surfaces as the rotating member is rotated under load.

GUSTAVE FAST.